June 30, 1925.

W. DYRSSEN

APPARATUS FOR HEATING AIR AND GASES

Filed Feb. 15, 1924

INVENTOR.
WALDEMAR DYRSSEN
BY
ATTORNEY.

June 30, 1925. 1,543,909
W. DYRSSEN
APPARATUS FOR HEATING AIR AND GASES
Filed Feb. 15, 1924 6 Sheets-Sheet 5

Fig. 8.

INVENTOR.
WALDEMAR DYRSSEN
BY
ATTORNEY.

Patented June 30, 1925.

1,543,909

UNITED STATES PATENT OFFICE.

WALDEMAR DYRSSEN, OF TARRYTOWN, NEW YORK.

APPARATUS FOR HEATING AIR AND GASES.

Application filed February 15, 1924. Serial No. 693,021. REISSUED

*To all whom it may concern:*

Be it known that I, WALDEMAR DYRSSEN, a citizen of the United States, and resident of Tarrytown, New York, have invented certain new and useful Improvements in Apparatus for Heating Air and Gases, of which the following is a specification.

This invention relates to heating apparatus adapted for use in connection with combustion furnaces in iron and steel plants or with boiler plants, but is, of course, not limited to such use.

The apparatus provides means for recovering heat from waste gases by heating the combustion air for the furnace from which the waste gases are obtained or by heating other gases or air for various other purposes.

There are two general types of apparatus for preheating air now in use, and my invention is an improvement over such conventional types of apparatus.

The first conventional type comprises a chamber provided with a multiplicity of pipes through which the air to be heated flows. The pipes being exposed on the outside to burning gases or to hot waste gases and the heat from these gases being transferred to the air by conduction of the heat through the walls of the pipes.

In some cases the pipes are of iron or steel and in other cases the pipes are made of brick and various refractory materials. This general type of apparatus is known in the art as a recuperator.

The second conventional type is known in the art as a regenerator or check-chamber and consists of not less than two chambers filled with brick-work laid up in checker-work fashion. This type is used for instance in connection with open hearth furnaces, and the bricks in the regenerators are heated up by gases coming from the outgoing end of the open hearth melting chamber, and subsequently the air is passed through the chamber which has been previously heated up. In order to obtain hot air continuously, the flow of gases is reversed and the chambers are alternately heated by the waste gases and cooled by the air passed through the chambers.

The latter type of apparatus is also used extensively in blast furnace practice. It is used where gases of high temperatures are available and where the air is to be preheated to a comparatively high temperature.

The recuperators referred to are used for a large number of purposes both for high and low temperatures. For low temperature work, that is, when the gases for heating the air are relatively cool, at the temperature, for example, of waste gases from boilers, this type requires an extremely large heating surface, because the temperature difference between the air and the waste gas is relatively small.

In these conventional recuperators the heat must travel by conduction through the pipes or other heating elements. This makes the heating element quite inefficient when soot or dirt is deposited on its surface. The installation is rather expensive and the maintenance is costly and troublesome due to the necessity of keeping the heating surfaces clean in order to maintain good efficiency. It is also necessary to prevent leakage between the two sides of the heating elements, which often is very troublesome when there is a considerable pressure difference between the air to be heated and the gases giving up their heat.

These factors have in the past prevented the general application and use of air heating apparatus when the hot gases are of a relatively low temperature.

My invention is adapted to overcome the disadvantages of the conventional types of apparatus heretofore used, and aims to provide means whereby the heat of waste gases of relatively low temperatures can be utilized for heating either air or gas.

My improved apparatus is adapted to utilize the waste gases from boilers and open hearth furnaces and especially after the waste gases from the open hearth furnaces have passed through waste heat boilers and have been somewhat depleted of their heat units. Such waste gases have usually a temperature of from approximately 500 to 700 degrees Fahrenheit.

The apparatus shown is adapted to preheat air to support combustion of fuel in a boiler, or to preheat the air and moisture blown into the producers used for making fuel for open hearth furnaces. It is also adapted for preheating air for supporting combustion in open hearth furnaces, or in regenerative heating furnaces, the apparatus when used in this way being usually so placed that the air is preheated thereby before it enters the usual regenerator chambers of the furnace. The apparatus can also be used for heating the combustion air in heating furnaces of the continuous type.

The apparatus operates on the regenerative principle, that is, the heat from the waste gases is stored in one part of the apparatus while the air is being heated in other parts thereof. I employ an improved metallic cellular structure for absorbing the heat which is so arranged that a very large heat absorption or convection surface can be provided in a relatively small space.

I also provide means whereby the gas and air are made to alternately traverse different chambers at frequent time intervals which makes it unnecessary to have as large a body of heat absorbing material as would otherwise be necessary.

Two embodiments of the invention are illustrated in the accompanying drawings in which.

Referring first to Figs. 1 to 6, the apparatus is provided with side walls 10 and 12, end walls 14 and 16 and a top wall 18 and a bottom 20. The interior of the apparatus is divided by transverse walls 22 and 24, which with the walls 14 and 16 and the walls 10 and 12 define three chambers 26, 28 and 30. These chambers are closed at the top and bottom respectively by longitudinally extending plates 32 and 34. The space between the plate 32 and the top 18 is divided by a longitudinally extending partition 36, which with the other walls defines two longitudinally extending conduits 38 and 40. Similarly the space between the bottom 20 and the plate 34 is divided by a longitudinally extending partition 42 which divides the lower part of the apparatus into two longitudinally extending conduits 44 and 46.

The conduits 38 communicates through a port 48 with a hot gas inlet pipe 50 and the conduit 44 communicates through a port 52 with a spent gas or outlet pipe 54. Similarly the conduit 40 communicates through a port 58 with an air outlet pipe 60. The conduit 46 communicates through a port 62 with an inlet pipe 64.

With the arrangement described, it will be seen that the longitudinally extending conduits 38, 40, 44 and 46 are all common to the several chambers 26, 28, 30. The apparatus is designed so that the waste gas which is to give up its heat, and the air to be heated pass alternatively through the several chambers 26, 28 and 30. That is to say, for a given interval, waste gas passes through a given chamber and then the supply of waste gas is cut off and the air to be heated is passed through the same chamber, and improved means are provided for automatically causing this reversal at determined time intervals and the chambers 26, 28 and 30 are each provided with an improved heat exchanging cellular structure which gives a maximum heat absorbing or heat exchanging surface in a minimum amount of space.

Figure 6:
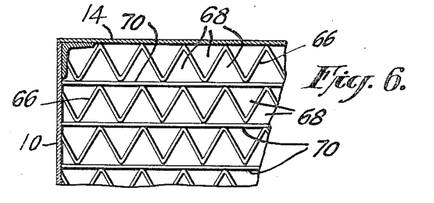
Fig. 6 is an enlarged top plan showing an improved type of cellular heat exchanging structure.

The details of construction of the heat exchanging structure are best shown in Fig. 6. These structures for each heating chamber are designated as a whole in the views of the assembled structure by numerals 27, 29 and 31. Each heat exchanging unit is made up of a great number of metal plates 66 which are bent in zig-zag fashion, as best shown in Fig. 6, to form a multiplicity of substantially equilateral cells 68. The neighboring plates 66 are separated by plain or smooth plates 70 so as to give a stable construction. The corrugated and smooth plates are not united, being merely loosely nested in the chambers, it being unnecessary in this form of heat exchanger to prevent leakage between the different cells.

This zig-zag formation enables me to provide an extremely large heating surface in a relatively small space. For example, if the triangular sides of the cells are approximately one-half an inch in length, I obtain approximately 140 to 150 square feet of heating surface per cubic foot, which is about six times as much as could be obtained by the use of one inch tubes of an ordinary recuperator.

It will be understood that as the hot waste gas passes through the heating chambers 26, 28 or 30, they give up the greater part of their heat to the metallic heat exchanging elements located in these chambers. Subsequently the air is passed through the chambers whereupon it is heated by contact with the cellular heat exchanging members.

The arrangement is such that the gas is continuously flowing through certain of the chambers and air to be heated is continuously flowing through other chambers. The control of this flow through the various chambers of the apparatus is effected by my improved valve arrangement to be presently described.

The passage of hot gas from the conduit 38, to the chambers 26, 28 and 30 is controlled by separate valves 72, 74 and 76. These valves are loosely centered on vertically movable rods 73, 75 and 77. Each of these valve rods is provided with a collar 78 which when the rods are lifted is adapted to lift the respective valve off its seat and thereby permit the gas to flow from the conduit 38 to the corresponding chamber, the wall 32 being provided with suitable openings to permit passage of the gas when the valves are lifted.

Communication between the chambers 26, 28 and 30 and the outlet conduit 44 is controlled by valves 82, 84 and 86 which are loosely centered on the same rods which carry the valves 72, 74 and 76. The valve rods 73, 75 and 77 are each guided at the top in bushings 88 and near their lower end in hubs 89 formed in spiders 90 secured to the wall 34. Each of the rods 73, 75 and 77 carries a collar 91 adapted when the corresponding valve rod is lifted, to lift the corresponding valve centered thereon.

Communication between the air conduit 40 and the chambers 26, 28 and 30 is controlled by valves 92, 94 and 96. These valves being loosely centered on valve rods 93, 95 and 97. Loosely centered on the lower part of these rods are air control valves 102, 104 and 106. The rods 93, 95 and 97 are each provided with a collar 108 which is adapted to lift the corresponding valve 92, 94 or 96 when the respective rod is raised, and at their lower ends each of the valve rods 93, 95 and 97 are provided with similar collars 111 arranged to lift the valves 102, 104 or 106 when a corresponding rod is lifted. The valve rods each being guided at the top by a suitable bushing 118, and near its lower end by a hub 119 formed in the spider 120.

Figure 1:
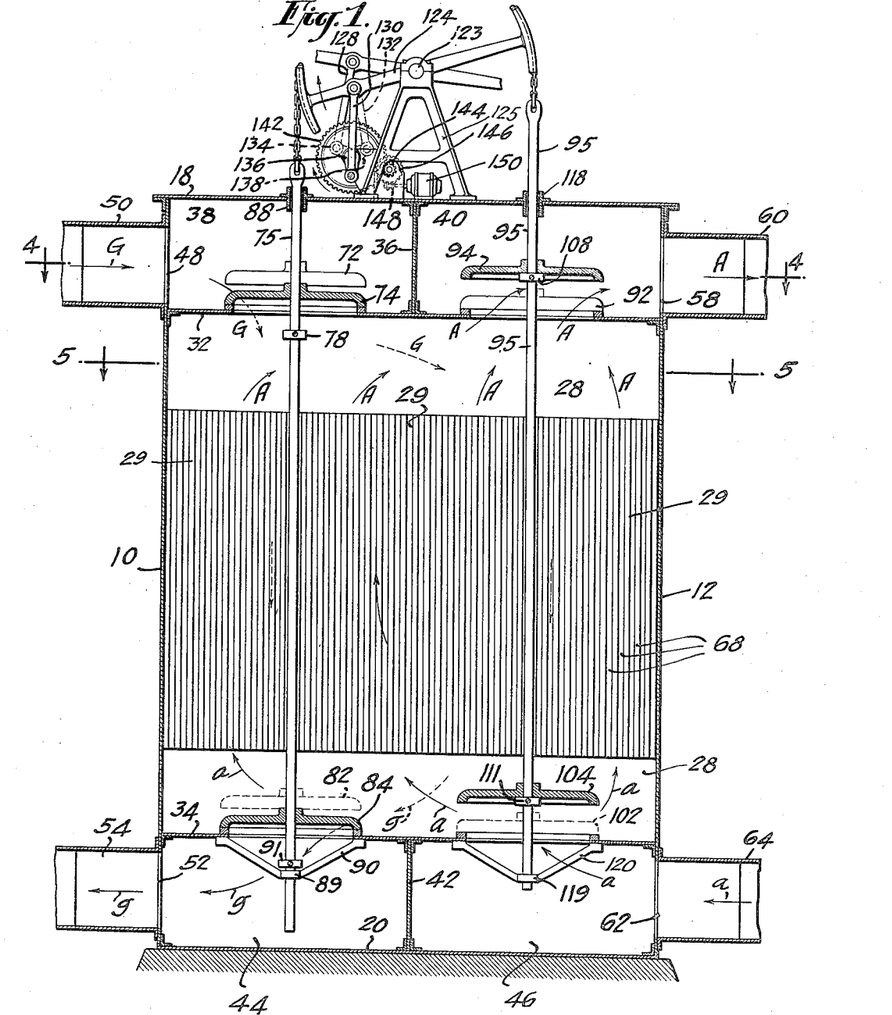
Fig. 1 is a transverse vertical section through one form of apparatus on line 1—1 of Fig. 2.
Figure 2:
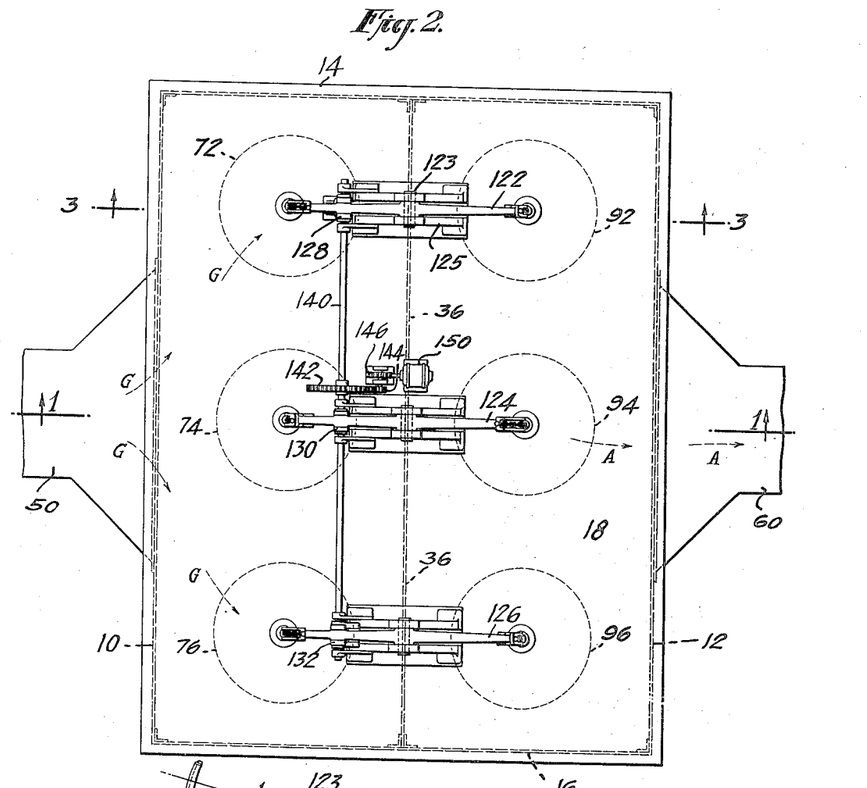
Fig. 2 is a top plan thereof.
Figure 3:
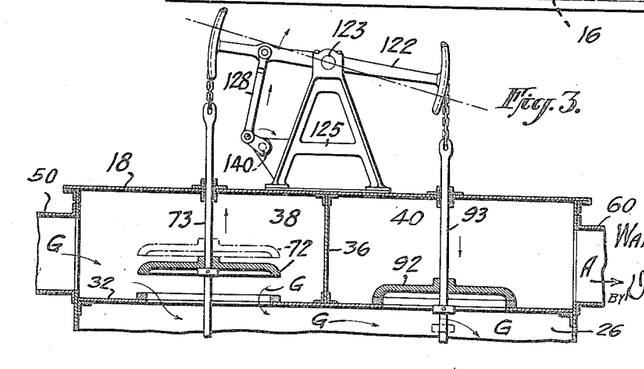
Fig. 3 is a fragmentary section on line 3—3 of Fig. 2.
Figure 4:
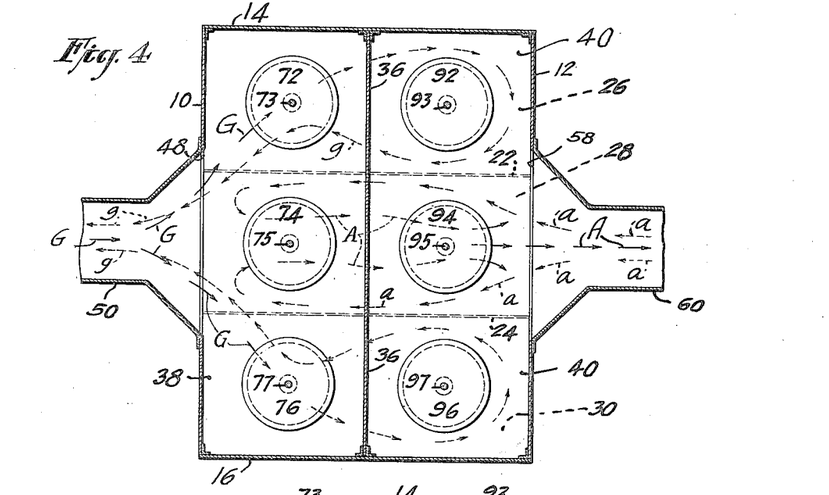
Fig. 4 is a horizontal section on a reduced scale on line 4—4 of Fig. 1.
Figure 5:
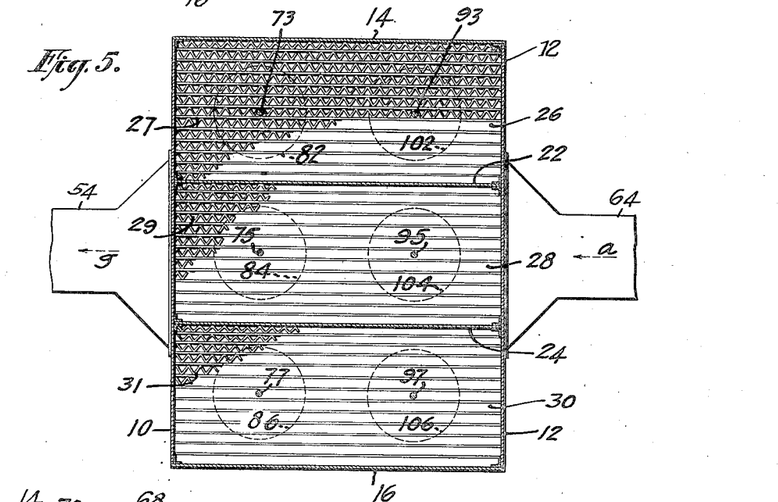
Fig. 5 is a horizontal section on line 5—5 of Fig. 1.

The valve rods 73 and 93 are connected by chains or cables as shown in Fig. 3 with the arcuate ends of a rocker arm 122 loosely mounted on a trunnion 123 carried by a bracket 125 so that when one of the rods is lifted the other rod is lowered. The rods 75 and 95 are similarly connected to a rocker arm 124 and the rods 77 and 97 are likewise connected with a rocker arm 126. The arms 122, 124 and 126 are connected respectively by links 128, 130 and 132 which are connected respectively with cranks 134, 136 and 138, which as shown in Fig. 1 are set 120 degrees apart, said cranks all being carried by a common crank shaft 140 having a driving gear 142 fixed thereon adapted to be driven by a pinion 144 through a worm gear 146 which meshes with a worm 148 driven by a motor 150.

Before describing the operation, attention is called to the fact that the arrows on the drawings, designated by G, represent the hot waste gases, while those designated by g, represent the spent gases or the waste gases which have given up their heat to the heat exchanging elements in the various chambers of the apparatus. The arrows indicated at a represent cool or incoming air, and the arrows designated by A represent the air which is heated in its passage through the cells of the heat exchanging units.

The hot waste gas is introduced through the pipe 50 to the longitudinal conduit 38, and with the parts in the position shown in the drawings, the valves 72 and 76 being open, the hot waste gas passes down into the chambers 26 and 30. In their passage through the heat exchanging elements 27 and 31 in these chambers, the waste gases contact with the vast area presented by the cellular heat exchanging units and the spent gases pass to the conduit 44 past the valves 82 and 86 which at this time are open; the gases passing outward to a suitable stack or exhaust fan through the pipe 54.

While the hot gases were taking the course above described, air flows in through the pipe 64 to the conduit 46 and past the open valve 104 (the valves 102 and 106 being closed at this time), and upward through the cellular heat exchanging unit 29 to the top of the chamber 28, the heated air flowing out past the valve 94 to the outlet conduit 40 and thence to the hot air pipe 60.

Figure 9:
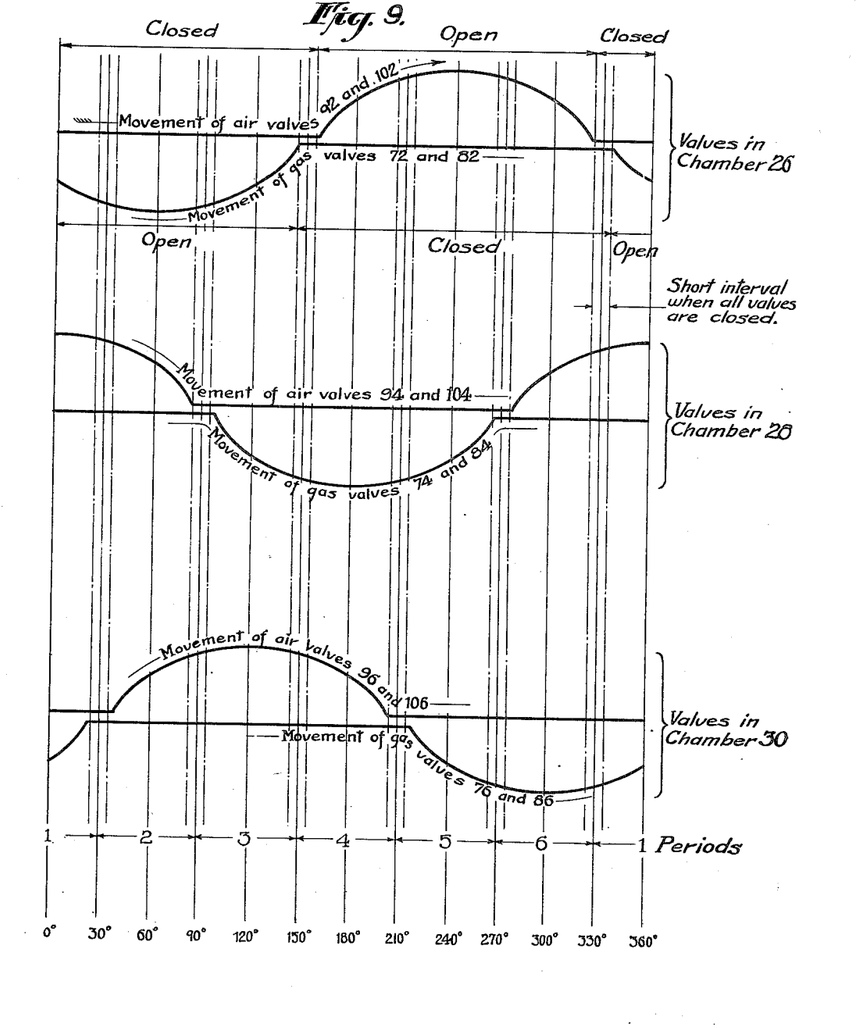
Fig. 9 is a diagram showing movements of reversing valves.

As the shaft 140 rotates slowly around (clockwise) the valves for the three chambers 26, 28 and 30 open and close successively and periodically. The motion of the valves is shown in Fig. 9. From this figure it can be seen that the valve motions during one revolution of the shaft 140 can be divided up in six periods in which the waste gases and air flow as follows:

Period I, waste gases flow through chambers 26 and 30; air flows through chamber 28.

Period II, waste gases flow through chamber 26; air flows through chambers 28 and 30.

Period III, waste gases flow through chambers 26 and 28; air flows through chamber 30.

Period IV, waste gases flow through chamber 28; air flows through chambers 26 and 30.

Period V, waste gases flow through chambers 28 and 30; air flows through chamber 26.

Period VI, waste gases flow through chamber 30; air flows through chambers 26 and 28.

In the diagram, one revolution of the valve operating shaft is shown as divided into intervals of 30 degrees by vertical lines, each period being numbered with a numeral from 1 to 6 inclusive. One half of the first period being shown at the left of the figure and the other half being shown at the right of the figure. Legends have been applied to the diagram and detailed description seems to be unnecessary, further than to say in passing, that the horizontal portion of the heavy lines indicating the valve movements represent the position of the valve when it rests on its seat, that is to say, when it is closed; while the curved lines represent the open movements of the valves. The space between the broken lines parallel to the vertical lines dividing the different periods in each case, represents an interval of time during which all of the valves, that is the gas valve and air valve for any one chamber are closed.

It will be appreciated that during such intervals there will be no communication between the gas and air chambers associated with these valves. This interval of time is secured by the provision of means of lost motion transmitting mechanism such as the collars carried by the valve rods.

As the crank shaft 140 rotates, it is clear that the several valve rods 73, 75, 77, 93, 95 and 97 are reciprocated at regular intervals. But by the provision of the collars 78, 91, 108 and 111 on the valve rods, a certain amount of lost motion is provided for so that one set of valves, for example, say the gas valves, remain seated for a short interval while the air valves are also seated. This prevents the possibility of passing hot waste gas directly from the pipe 50 through any of the chambers 26, 28 or 30 to the hot air pipe 60. It will be understood that the collars may be adjustably mounted on the valve rods so as to secure any desired dwell of the valves in their closed position.

The rotating speed of shaft 140 which operates the valves may vary considerably and may be as high as two or three revolutions per minute and as low as one-fifth or one-tenth revolution per minute. The heat transfer takes place more efficiently with higher speed, but at the same time there is a certain amount of mixing of gases and air due to the volume of the chambers containing the heating elements. This unavidable mixing is less with lower speed. The wear of all moving parts and valves makes it also desirable to use a low shaft speed. In practice the advantages and disadvantages must be weighed against each other for determining upon the proper speed for shaft 140.

Figure 7:
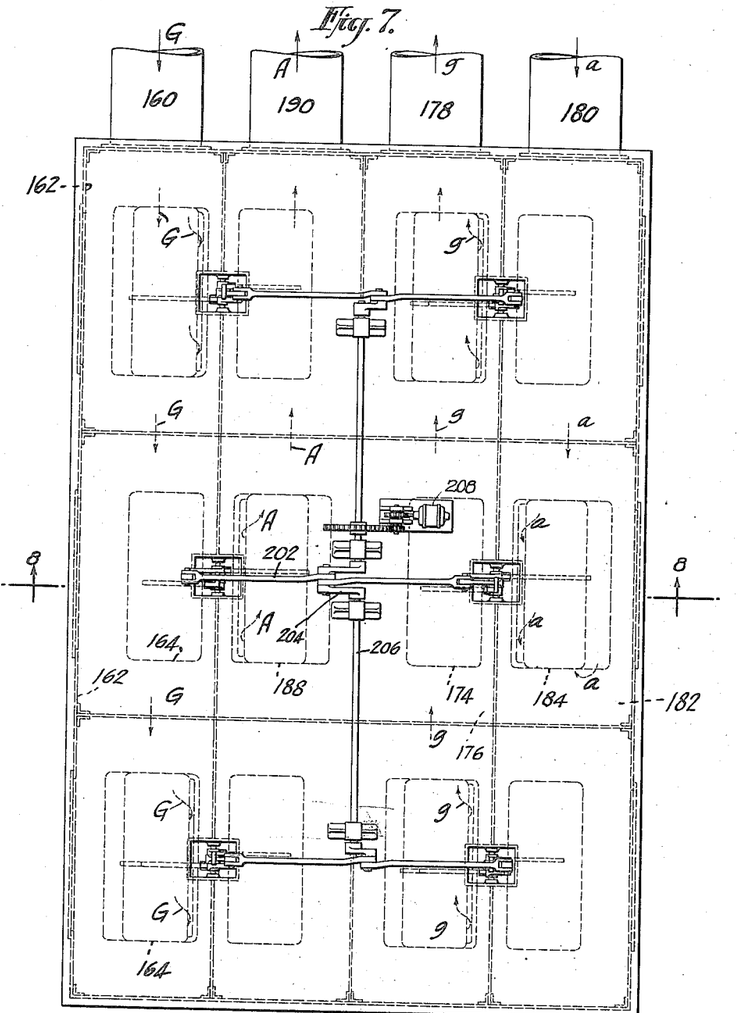
Fig. 7 is a top plan of a modified embodiment of the invention.
Figure 8:
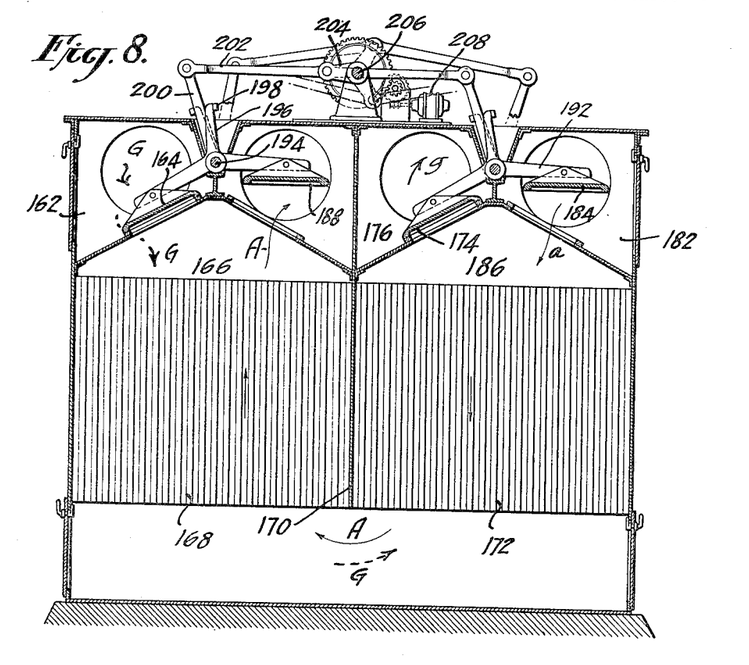
Fig. 8 is a vertical section thereof on line 8—8 of Fig. 7.

In the apparatus shown in Figs. 7 and 8, the valves are all located above the heating chambers, the hot gases entering through a pipe 160 passing to a hot gas conduit 162 past one of the valves 164 to the chamber 166 through the heat exchanging unit 168 and around the wall 170 through a second heat exchanger unit 172, and out past one of the open valves 174 to a conduit 176 to the spent gas outlet pipe 178. The cool air from an inlet pipe 180 enters a conduit 182 past one of the open valves 184 to the the upper part of the heating chamber 186 through the heat exchanging units 172 and 168. The air passing out in the direction of the arrow A and past the open valve 188 to the hot air outlet pipe 190. The valves 164, 174, 184 and 188 are all carried on similar bell cranks 192 loosely pivoted on longitudinal shafts 194 and having arms 196 provided with lugs 198 adapted to co-operate with an arm 200 which is oscillated by a link 202 which receives its motion from a crank 204 carried on the crank shaft 206 driven through suitable reduction gearing by a motor 208.

The operation of this apparatus is very similar to that above described, and it is not thought that further description is necessary, it being evident from the drawings that as the crank shaft 206 is revolved, the various valves will be so manipulated that the waste gases and air will be passed alternately through the different chambers shown in Fig. 7. The lugs 198 on the bell crank arms 196 are so positioned with respect to the arms 200 that a certain amount of lost motion is provided for in order to prevent the direct passsage of gas from the gas inlet pipe to the air outlet pipe and vice versa, or the passage of air from the air inlet pipe 180 to the gas outlet pipe 178.

In the foregoing I have described an apparatus having three chambers, as this is the minimum number at which a continuous flow of waste gases and air can be obtained. It is to be understood that if necessary or desirable more chambers may be used, it being merely necessary to provide one valve operating crank for each chamber, and to so set the cranks with respect to one another that their angular relation is equal to 360 degrees divided by the number of chambers or the number of cranks.

With three chambers there are slight fluctuations in the flow of air and gas due to the variation in resistance encountered by the latter in passing through the heat exchangers and the heating units located therein. It is apparent that at times the gases and air respectively pass through two chambers and at times through only one chamber. These fluctuations are minimized, however, by the variation in the opening of the valves.

In most cases these fluctuations are of little consequence. However, it is to be understood that the fluctuations can be entirely eliminated by employing a greater number of chambers.

Throughout the foregoing description and in the claims, I have referred to the terms "waste gas" and "air." It is, of course, to be understood that I am not limited to the use of waste gas for heating the heat exchanging elements, nor do I intend the claims to limit the application to the heating of air, it being clear that the heat exchanging element may be heated by air, if necessary or desirable, and that the apparatus can be used to heat fuel and gas as well as air. The terms gas and air being used for convenience of expression and these terms are not to be construed in a limiting sense.

Though I have described with great particularity the specific construction and arrangement of the embodiments of the invention illustrated, it is not to be interpreted that I am limited thereto as various changes in arrangement and substitution of equivalents may be made by those skilled in the art without departing from the invention as defined in the appended claims.

What I claim is:

1. An apparatus of the class described comprising a plurality of chambers each having a multiplicity of heat exchanging plates therein and means for automatically passing hot gases in contact with said plates for a determined period and then passing air to be heated in contact therewith for another period.

2. An apparatus of the class described comprising a plurality of chambers each having a multiplicity of nested heat exchanging plates therein and automatically controlled means for alternately passing hot gases and cool air in contact with said plates for determined periods of time, the apparatus being so arranged that the waste gas flows continuously therethrough in one direction and the air to be heated also flows continuously in one direction.

3. An apparatus of the class described comprising a plurality of chambers each having a multiplicity of metal heat exchanging plates therein, a hot gas inlet and a spent gas outlet common to said chambers, a cool air inlet and a heated air outlet common to said chambers and means automatically controlling the passage of both gas and air to and from said chambers at regular time intervals.

4. An apparatus of the class described comprising a plurality of chambers each having a multiplicity of nested corrugated metal plates therein arranged to form a multitude of passages having a vast surface and automatically controlled means for alternately controlling the passage of gas and air respectively through each of said chambers.

5. An apparatus of the class described comprising a plurality of chambers each having a multiplicity of alternately arranged flat and corrugated nested metal plates forming a multitude of passages having a vast surface and means for alternately supplying hot gas and cool air respectively to each of said chambers.

6. An apparatus of the class described comprising a plurality of chambers each having a metallic cellular heat exchanging structure therein, hot gas and spent gas conduits common to said chambers, cool air and heated air conduits common to said chambers, gas valves and air valves controlling the passage of gas and air to and from said chambers and mechanism for automatically opening and closing said valves in a regular sequence so that gas and air respectively are alternately passed through each of said chambers.

7. An apparatus of the class described comprising a plurality of transversely extending chambers each having a metallic cellular heat exchanging structure therein; longitudinally extending gas inlets and gas outlets, air inlet and air outlet conduits serving said chambers, valves controlling the supply and discharge of gas and air to and from said chambers and means for automatically opening and closing said valves in a determined sequence so that a continuous unidirectional stream of gas and a continuous unidirectional stream of air are passed through the apparatus.

8. In an apparatus of the class described, a plurality of chambers each having a metallic head exchanging cellular unit therein, a gas inlet and a gas outlet conduit common to said chambers, an air inlet and an air outlet conduit common to said chambers, valves controlling the passage of gas and air to and from said chambers and means for automatically actuating said vlaves so that a unidirectional flow of gas and a unidirectional flow of air is maintained through the apparatus.

9. In an apparatus of the class described, a metallic heat exchanging unit comprising a cellular structure formed of a multiplicity of corrugated plates separated by flat plates loosely interposed between said corrugated plates and unconnected therewith.

10. In an apparatus of the class described, a metallic heat exchanging unit comprising a multiplicity of bent plates of zig-zag sectional formation and comparatively smooth plates loosely interposed between the latter to prevent warping or deformation of the plates.

11. In an apparatus of the class described, a metallic heat exchanging unit comprising a multiplicity of plates each bent to form a series of substantially triangular convolutions and a multiplicity of substantially smooth plates interposed between the bent plates.

12. In an apparatus of the class described, a metallic heat exchanging unit comprising a multiplicity of plates each bent to form a series of substantially equilateral triangular channels, and a multiplicity of substantially plain plates interposed between the bent plates.

13. In an apparatus of the class described, a chamber having a heat exchanging element therein, gas supply conduit, an air supply conduit, a gas outlet conduit, an air inlet conduit, separate gas valves controlling communication between the chamber and said supply and outlet conduits, a member for simultaneously closing or opening both gas valves, a member for simultaneously opening or closing both air valves, said members being so arranged that both the gas and air valves remain closed for a short time interval before their positions are reversed.

14. In an apparatus of the class described, a chamber having a heat exchanging element therein, a gas supply conduit, an air supply conduit, a gas outlet conduit, an air outlet conduit, separate gas valves controlling communication between the chamber and the supply and outlet conduits respectively and separate air valves controlling communication between the chamber and said air supply and outlet conduits, valve actuating mechanism including a lost-motion device whereby the gas and air valves both dwell in closed position for a short interval before their positions are reversed.

15. In an apparatus of the class described, a chamber having a heat exchanging element therein, a gas supply conduit, an air supply conduit, a gas outlet conduit an air outlet conduit, separate gas valves controlling communication between the chamber and the supply and outlet conduits respectively and separate air valves controlling communication between the chamber and said air supply and outlet conduits, valve actuating mechanism including a constantly driven member and a lost-motion device whereby the gas and air valves both dwell in closed position for a short interval before their positions are reversed.

In witness whereof, I have hereunto signed my name.

WALDEMAR DYRSSEN.